(12) United States Patent
Takizawa

(10) Patent No.: US 11,983,659 B2
(45) Date of Patent: May 14, 2024

(54) MEDICAL MATERIAL TRANSPORT SYSTEM

(71) Applicant: Hitachi High-Tech Corporation, Tokyo (JP)

(72) Inventor: Hikaru Takizawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 464 days.

(21) Appl. No.: 17/418,911

(22) PCT Filed: Feb. 5, 2020

(86) PCT No.: PCT/JP2020/004295
§ 371 (c)(1),
(2) Date: Jun. 28, 2021

(87) PCT Pub. No.: WO2020/175057
PCT Pub. Date: Sep. 3, 2020

(65) Prior Publication Data
US 2022/0114536 A1    Apr. 14, 2022

(30) Foreign Application Priority Data

Feb. 25, 2019   (JP) .................................. 2019-031619

(51) Int. Cl.
*G06Q 10/083*    (2024.01)
*B64C 39/02*     (2023.01)
(Continued)

(52) U.S. Cl.
CPC ......... *G06Q 10/083* (2013.01); *B64C 39/024* (2013.01); *B64D 1/10* (2013.01);
(Continued)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| 6,015,246 A | 1/2000 | Yamane et al. |
| 2014/0032034 A1 | 1/2014 | Raptopoulos et al. |

(Continued)

FOREIGN PATENT DOCUMENTS

| CN | 205916347 U | 2/2017 |
| CN | 106882363 A | 6/2017 |

(Continued)

OTHER PUBLICATIONS

Amukele, Timothy, et al. "Drone transportation of blood products." Transfusion 57.3 (2017): 582-588. (Year: 2017).*

(Continued)

*Primary Examiner* — Emmett K. Walsh
(74) *Attorney, Agent, or Firm* — Crowell & Moring LLP

(57) ABSTRACT

The present invention realizes a medical material transport system that is low-cost, stable, and safe, the medical material transport system being such that even if a failure occurs in an individual specimen transport device, the failure does not extend to the system as a whole. Collection of a specimen is requested from a specimen collection request terminal 107, and a management unit (108) issues a reception command 110 for the specimen. A drone 101 that has received the reception command 110 for the specimen departs from a standby dock 105 on the basis of the received information and flies to a specimen recovery location 106, and a specimen tray for placing the specimen is taken out from a specimen holder 102. A specimen container is contained in the specimen tray, and the specimen tray is returned to the specimen holder 102 and locked using a lock mechanism.

(Continued)

The drone 101 flies to an arrival station 104, and after arriving, uses an unlocking key, and the specimen tray is disengaged from the specimen holder 102. After the specimen container in the specimen tray is collected, the specimen tray is placed in the specimen holder 102, and the drone 101 returns to the standby dock 105.

19 Claims, 12 Drawing Sheets

(51) Int. Cl.
*B64D 1/10* (2006.01)
*B64D 45/00* (2006.01)
*B65G 61/00* (2006.01)
*B64U 10/13* (2023.01)
*B64U 101/60* (2023.01)

(52) U.S. Cl.
CPC ............ *B64D 45/00* (2013.01); *B65G 61/00* (2013.01); *B64D 2045/008* (2013.01); *B64U 10/13* (2023.01); *B64U 2101/60* (2023.01); *B64U 2201/104* (2023.01)

(56) References Cited

U.S. PATENT DOCUMENTS

| | | | | |
|---|---|---|---|---|
| 2017/0287341 | A1* | 10/2017 | Jarrell | B64F 1/362 |
| 2018/0092484 | A1* | 4/2018 | Lewis | A47G 29/20 |
| 2019/0034868 | A1 | 1/2019 | Konanur et al. | |
| 2019/0080620 | A1 | 3/2019 | Sugaya | |
| 2020/0072619 | A1* | 3/2020 | Fukui | G01C 21/3878 |
| 2020/0250611 | A1* | 8/2020 | Pourteymour | G06F 9/542 |

FOREIGN PATENT DOCUMENTS

| | | | |
|---|---|---|---|
| CN | 206552253 U | * | 10/2017 |
| CN | 107340781 A | | 11/2017 |
| JP | 9-77252 A | | 3/1997 |
| JP | 10-329949 A | | 12/1998 |
| JP | 11-131873 A | | 5/1999 |
| JP | 2004-68421 A | | 3/2004 |
| JP | 2005-263112 A | | 9/2005 |
| JP | 2008-297062 A | | 12/2008 |
| JP | 2017-87524 A | | 5/2017 |
| JP | 2018-147412 A | | 9/2018 |
| JP | 2018-165115 A | | 10/2018 |
| JP | 2018-193022 A | | 12/2018 |
| JP | 2018-203058 A | | 12/2018 |
| JP | 2018193022 A | * | 12/2018 |
| WO | WO 2017/083406 A1 | | 5/2017 |
| WO | WO 2017/208355 A1 | | 12/2017 |
| WO | WO 2018/189770 A1 | | 10/2018 |
| WO | WO 2019/028071 A1 | | 2/2019 |

OTHER PUBLICATIONS

International Search Report (PCT/ISA/210) issued in PCT Application No. PCT/JP2020/004295 dated Mar. 31, 2020 with English translation (five (5) pages).

Japanese-language Written Opinion (PCT/ISA/237) issued in PCT Application No. PCT/JP2020/004295 dated Mar. 31, 2020 (five (5) pages).

Japanese-language Office Action issued in Japanese Application No. 2021-501834 dated Aug. 16, 2022 with English translation (21 pages).

Extended European Search Report issued in European Application No. 20762911.4 dated Sep. 22, 2022 (13 pages).

Wendover Productions: "The Super-Fast Logistics of Delivering Blood By Drone", Jan. 25, 2019, https://www.youtube.com/watch?v=bnoUBfLxZz0, XP055960290 (two (2) pages).

International Preliminary Report on Patentability (PCT/IB/338 & PCT/IPEA/409) issued in PCT Application No. PCT/JP2020/004295 dated Aug. 26, 2021 (eight (8) pages).

Chinese-language Office Action issued in Chinese Application No. 202080014048.1 dated Jan. 10, 2024 with English translation (32 pages).

* cited by examiner

[FIG. 1]
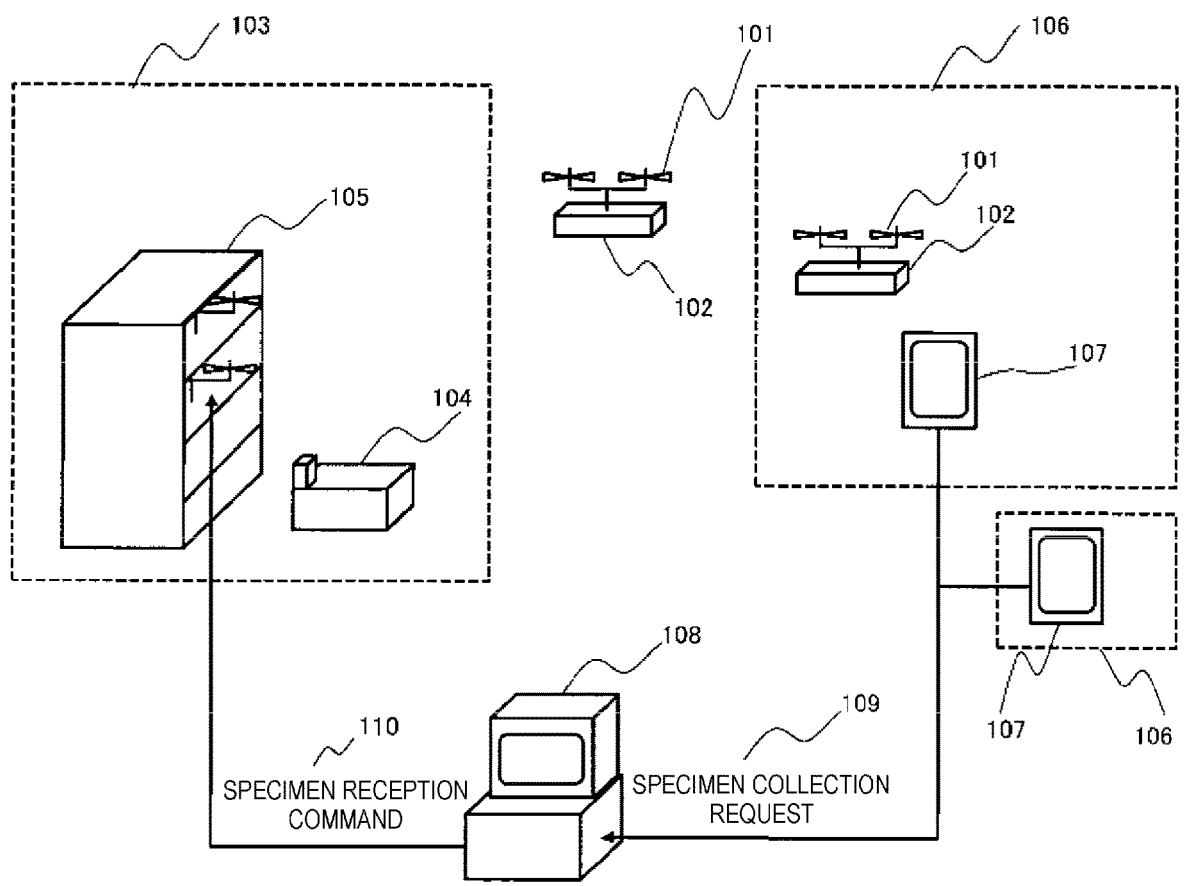

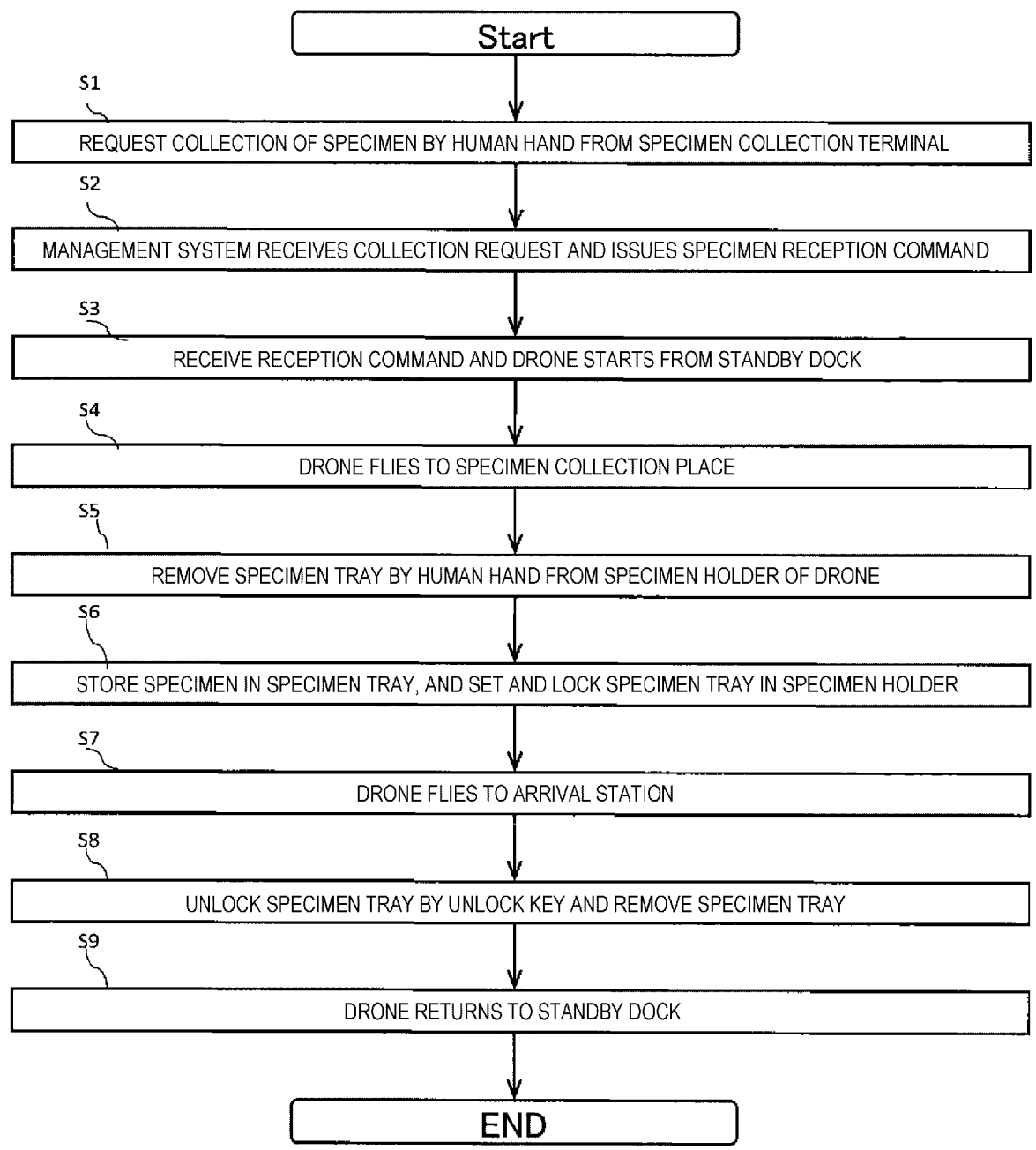
[FIG. 2]

[FIG. 3]
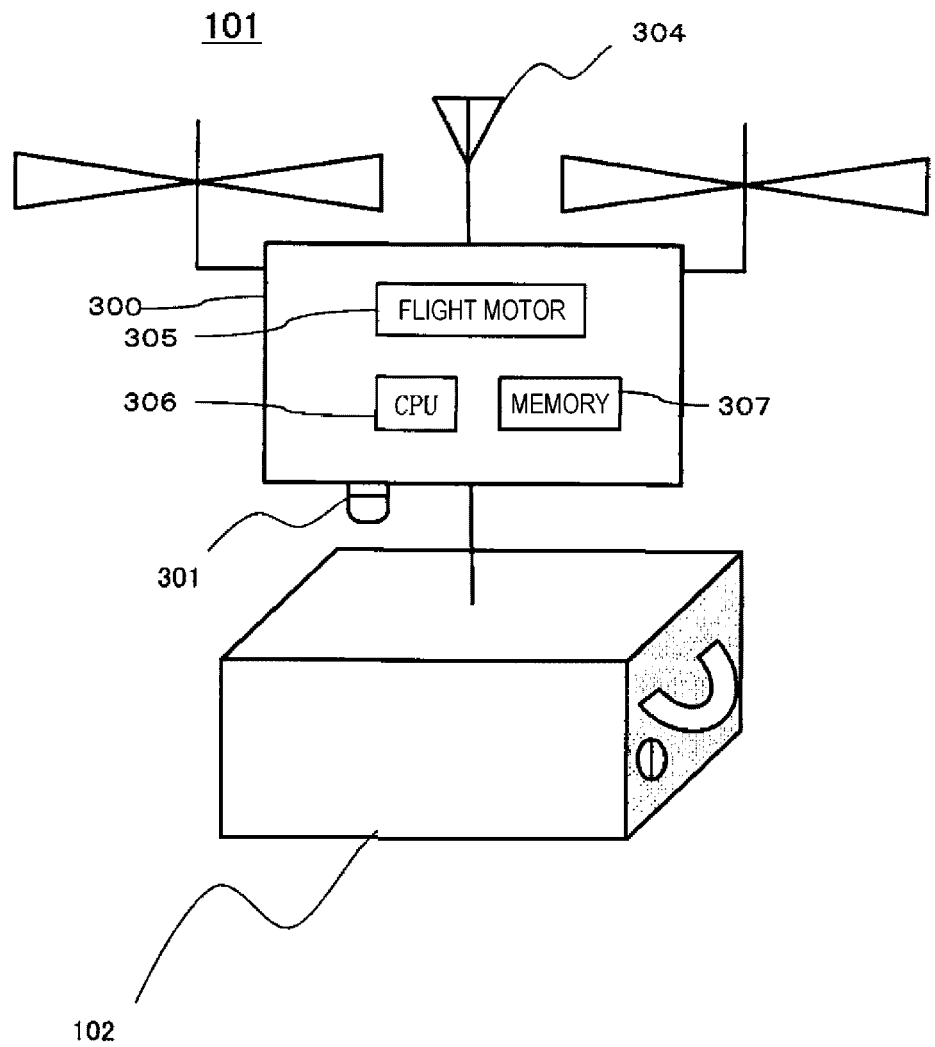
[FIG. 4]
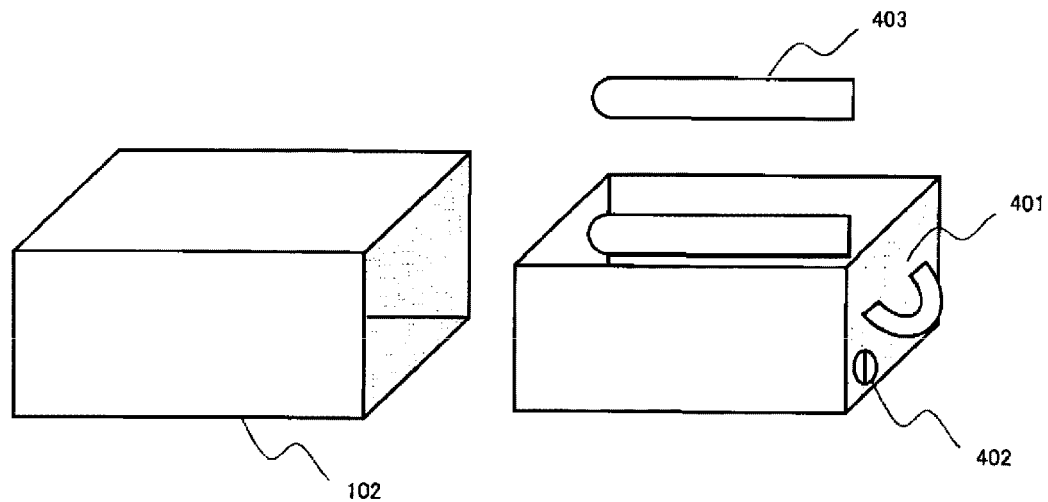

[FIG. 5]
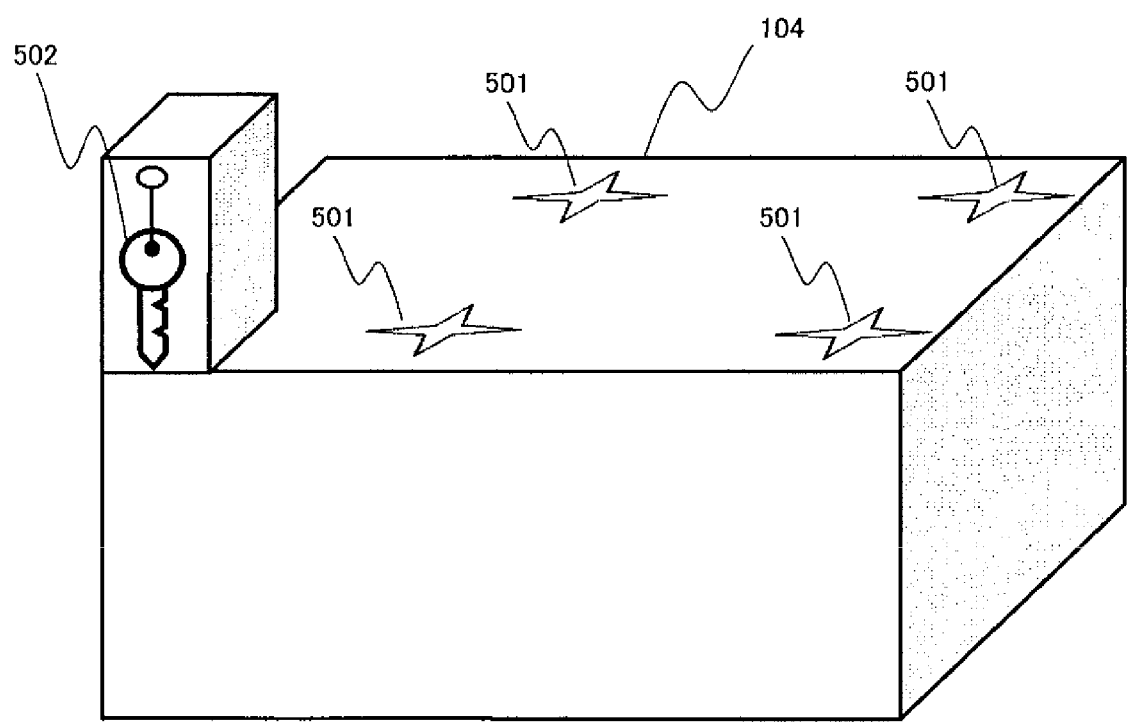

[FIG. 6]
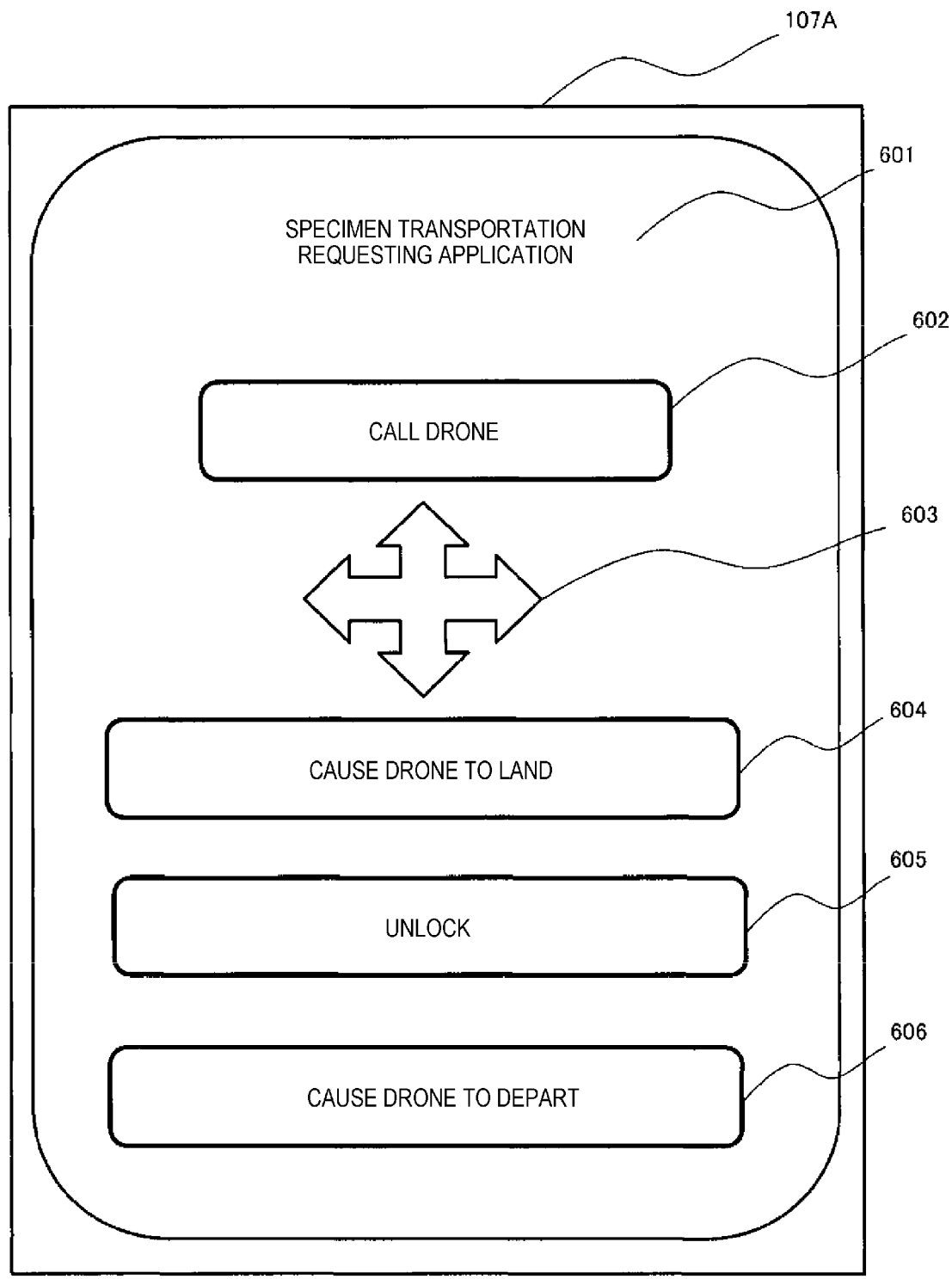

[FIG. 7]
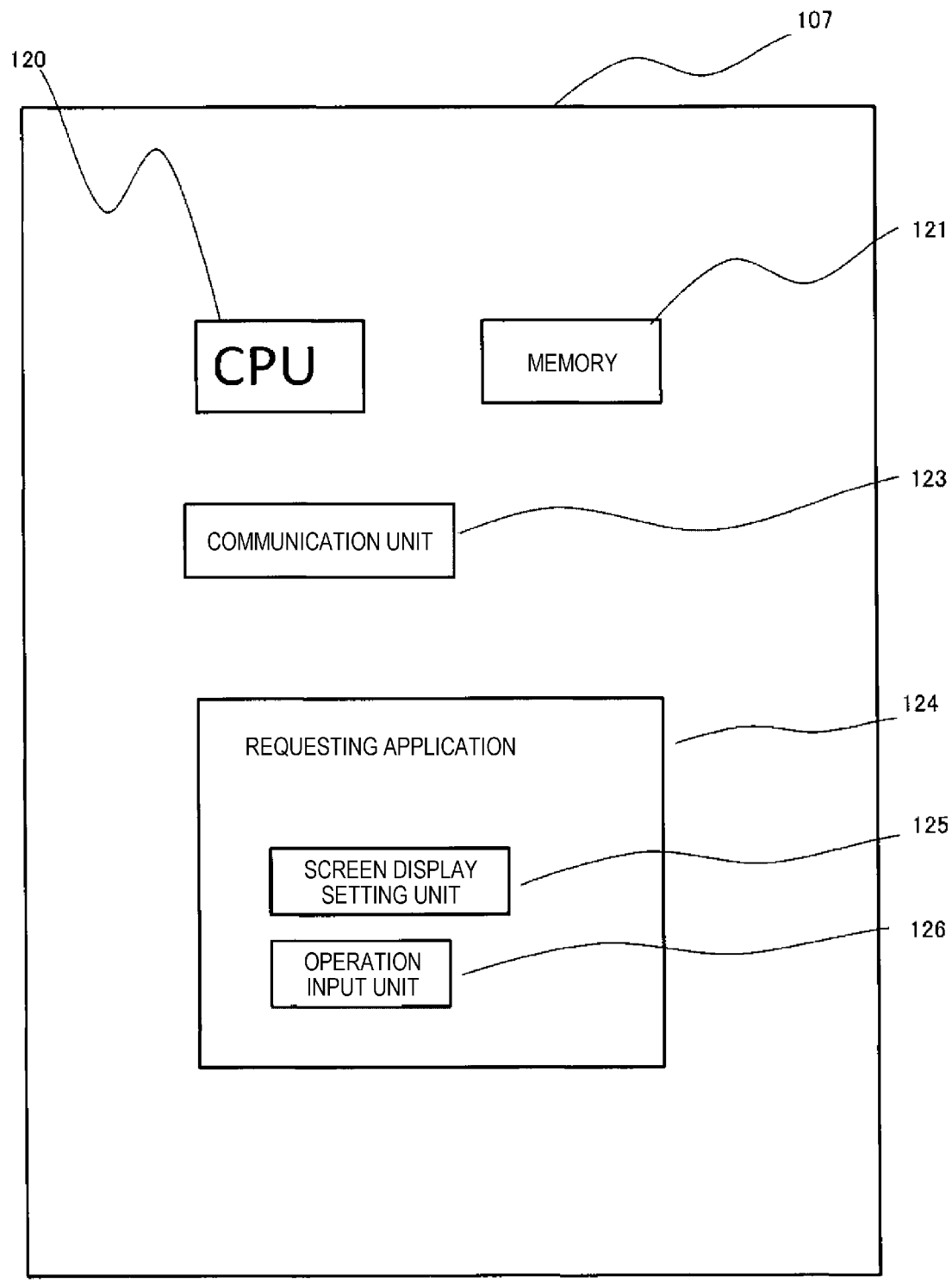

[FIG. 8]
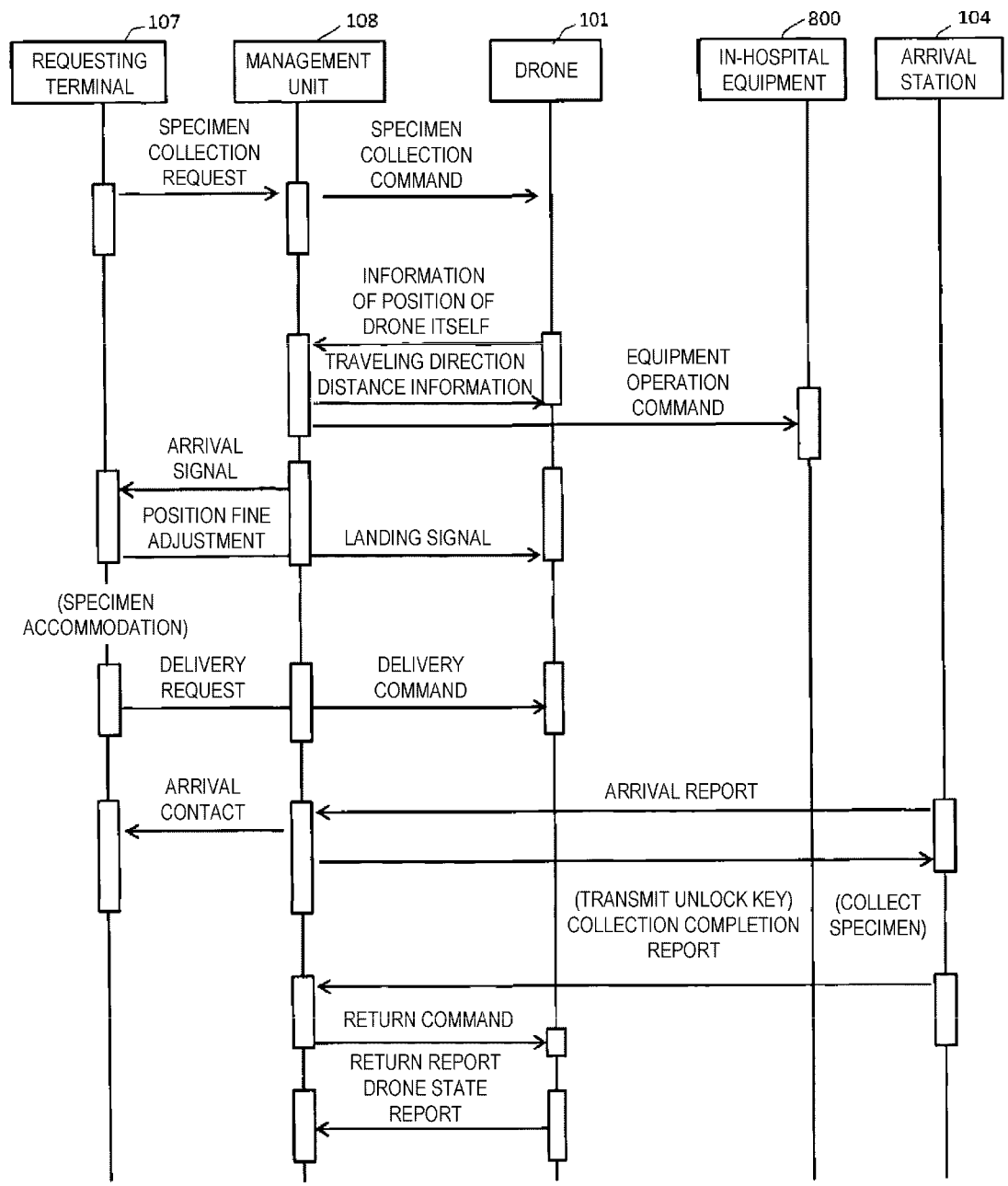

[FIG. 9]
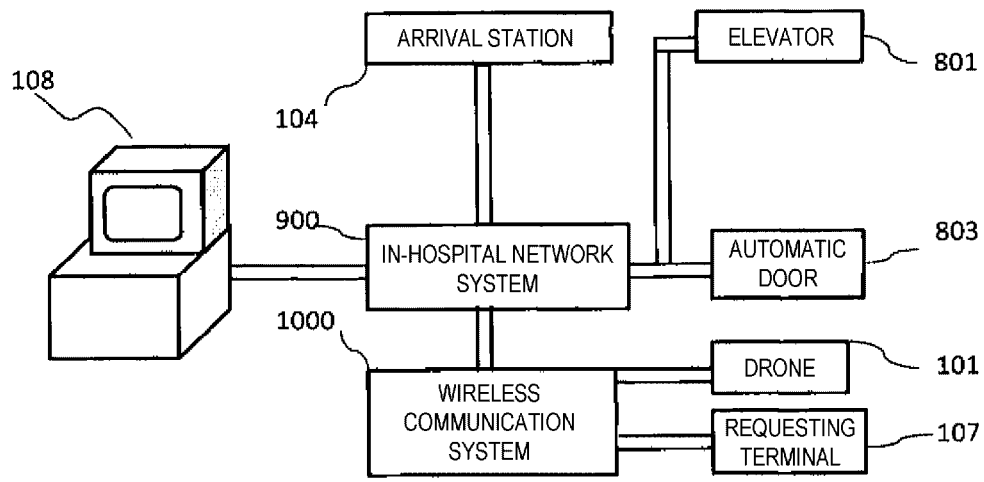
[FIG. 10]
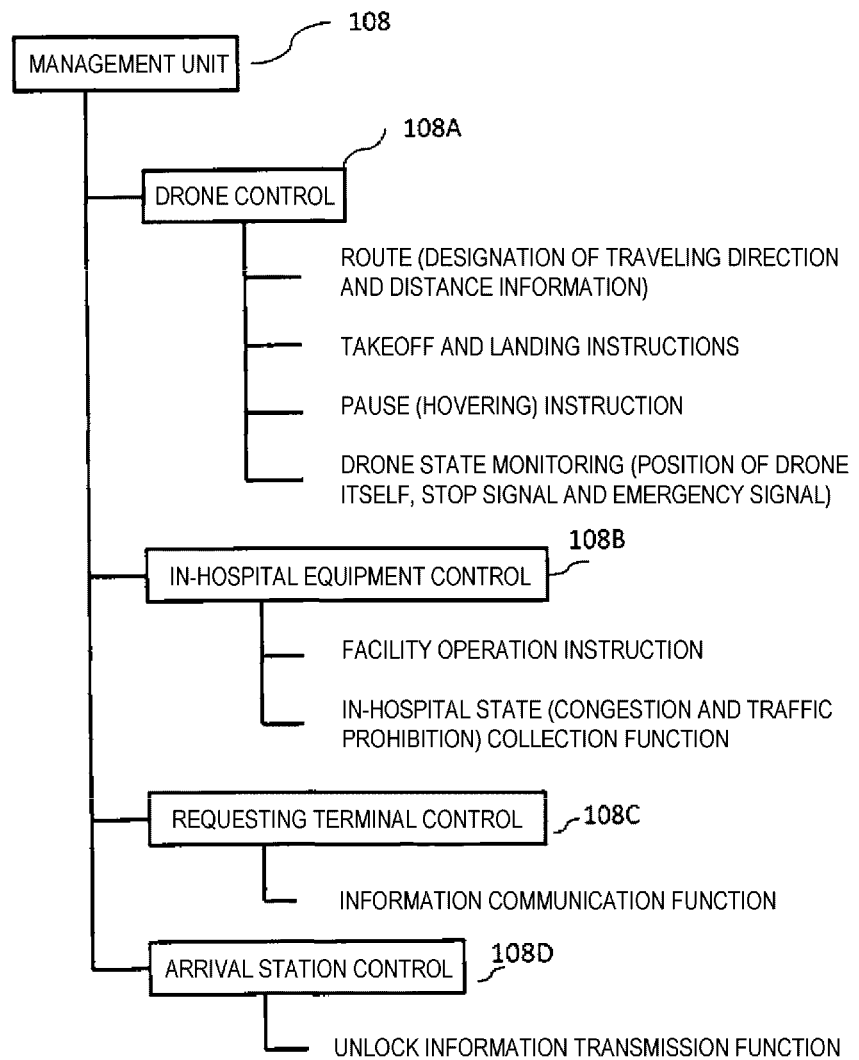

[FIG. 11]
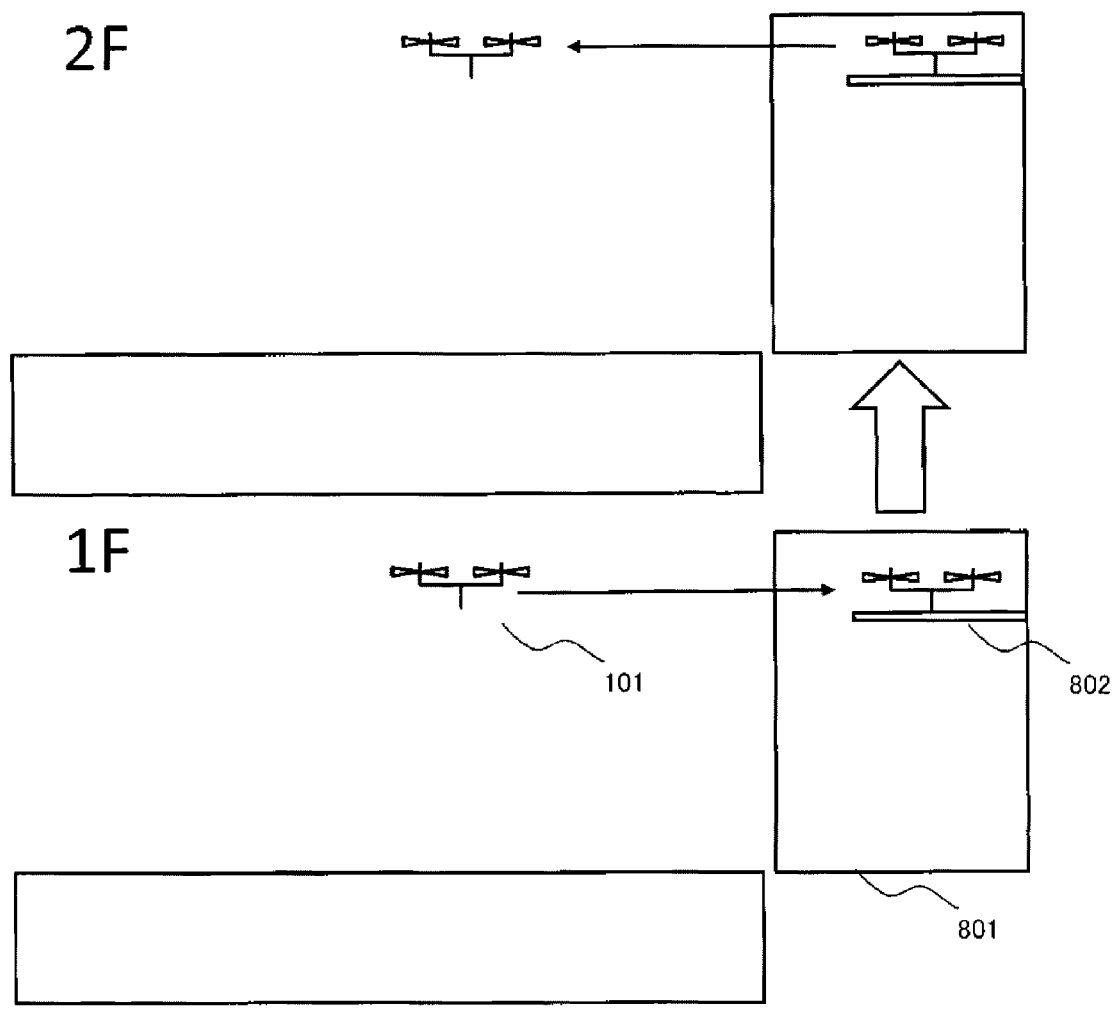

[FIG. 12]
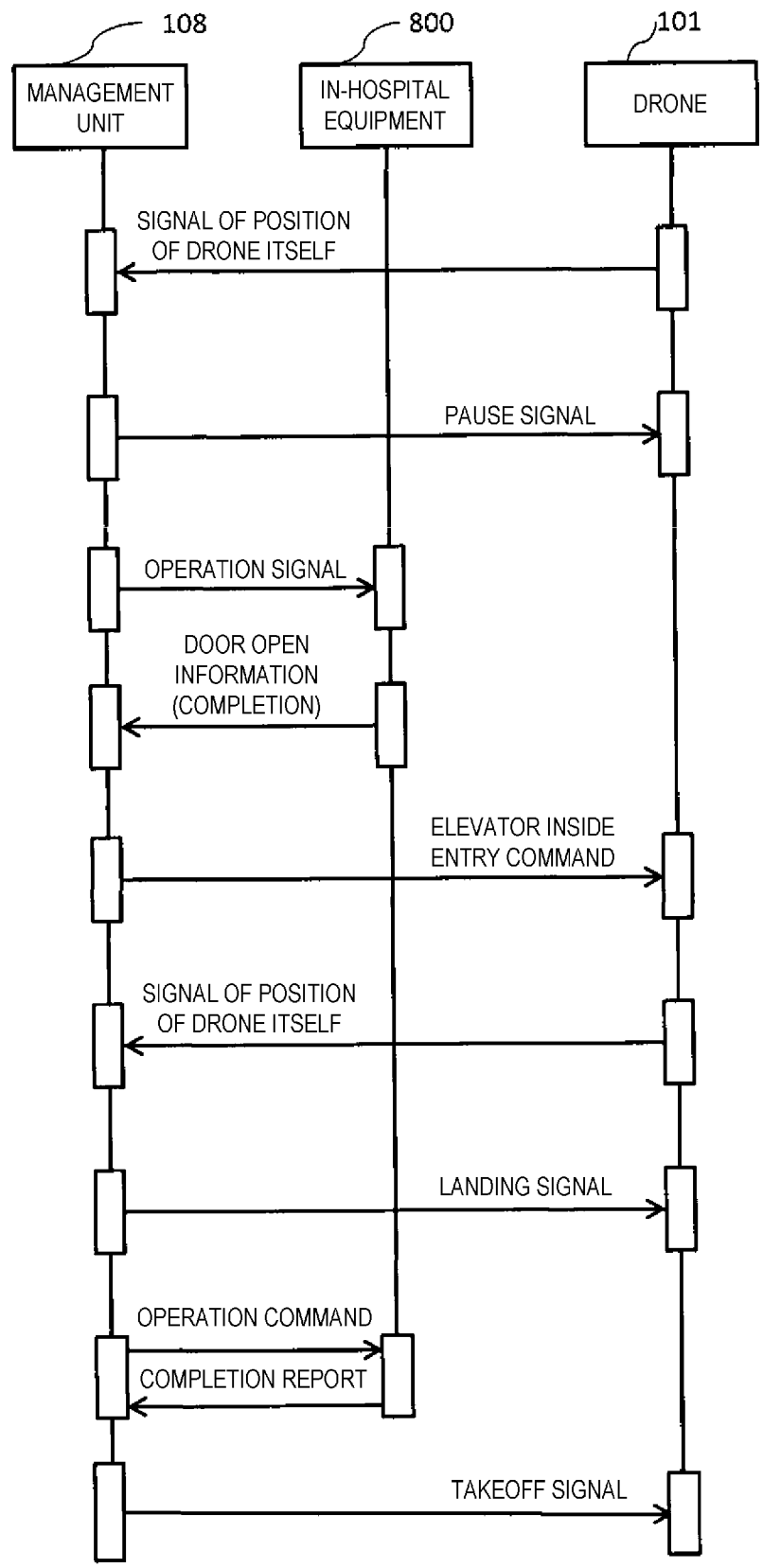

[FIG. 13]
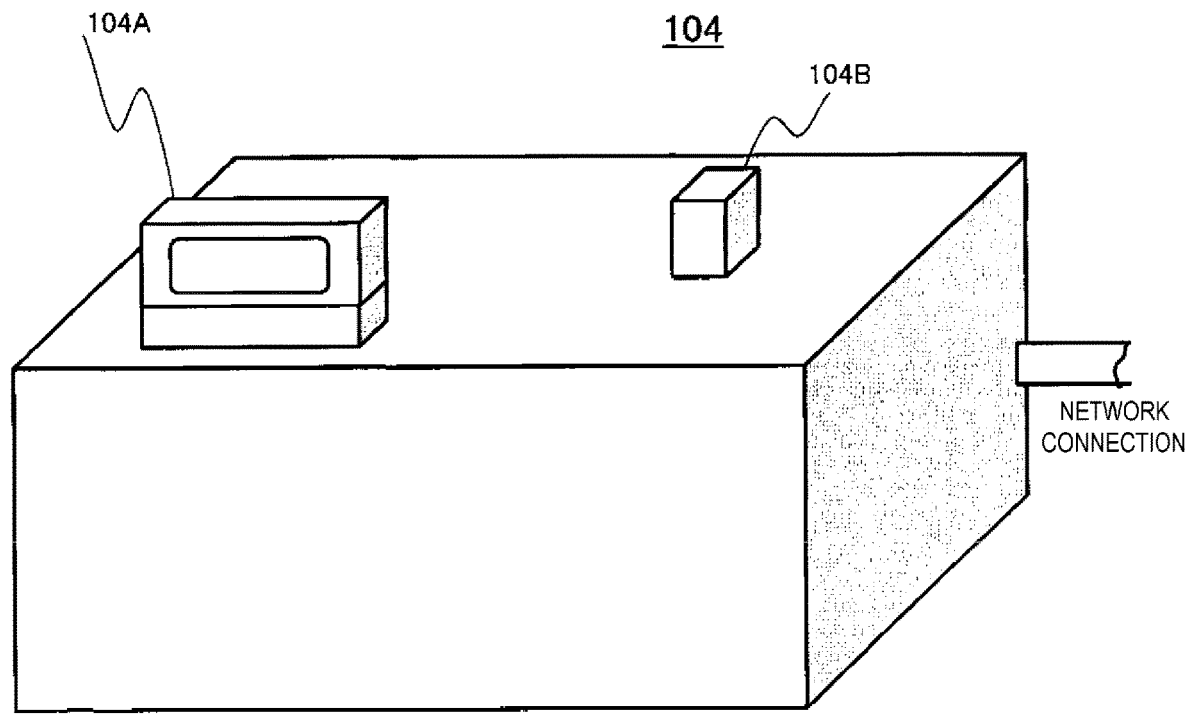
[FIG. 14]
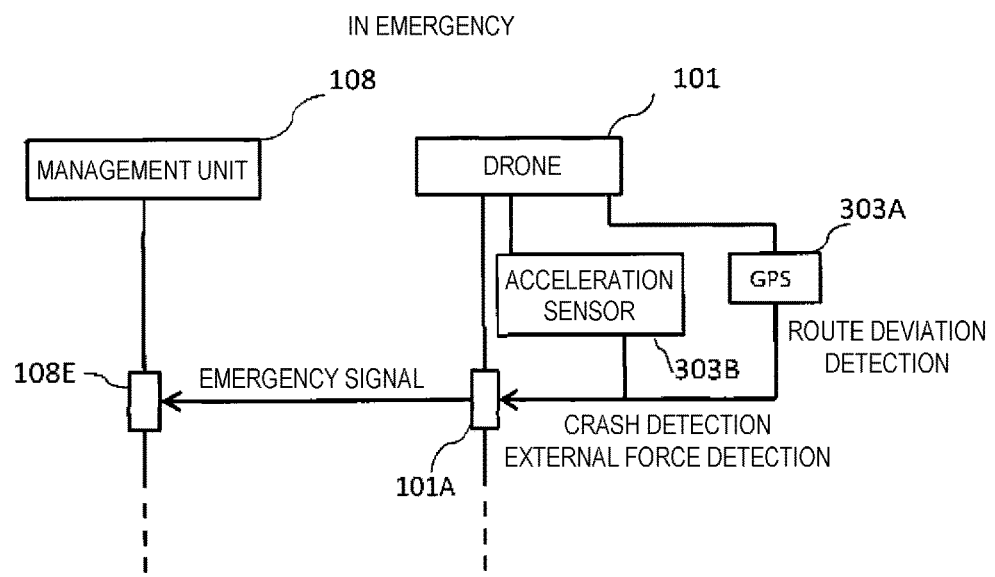

[FIG. 15]
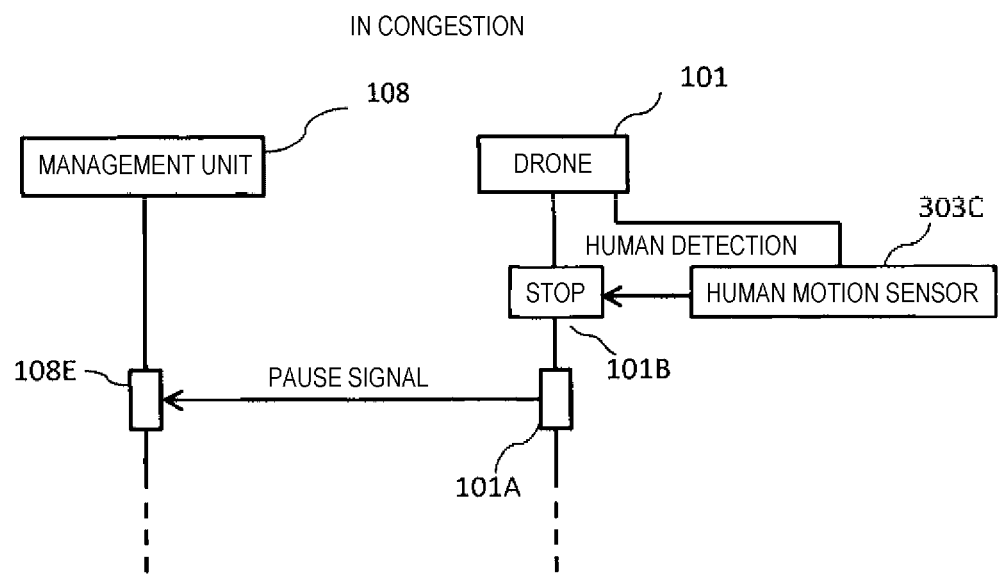

MEDICAL MATERIAL TRANSPORT SYSTEM

TECHNICAL FIELD

The present invention relates to a medical material transport system that transports a medical material such as a specimen used in an analysis device for clinical examination and the like in a hospital and the like.

BACKGROUND ART

In a clinical examination work, a clinical examination room for testing a specimen, a blood collection room for collecting the specimen, a disease room, and the like are often located physically apart from one another, and it is essential to transport the specimen from a collection place of the specimen to the clinical examination room in order to measure the specimen. Since it takes time and effort to transport the specimen with a human hand after the specimen is collected, a technique for automatically transporting the specimen has been developed.

In a related art, in order to transport a specimen to an examination room without being transported by a human hand, it has been common to use an air supply tube that transports the sample with air pressure in the tube. The tube is spread in a facility.

In order to protect a specimen from an impact of high-speed transport by the air supply tube, a transport device described in PTL 1 in which an air supply member is provided with a protective material, and a transport device described in PTL 2 in which an antibacterial air supply member is provided for preventing infection are provided.

As a device that transports a medical material in a hospital, a transport device described in PTL 3 including a transport system using a self-propelled carriage is provided.

CITATION LIST

Patent Literature

PTL 1: JP-A-H9-77252
PTL 2: JP-A-H10-329949
PTL 3: JP-A-2008-297062

SUMMARY OF INVENTION

Technical Problem

According to a technique in related arts, a device that automatically transports a specimen from a collection place to a clinical examination room has been implemented.

However, the transport system using the air supply tube requires a great deal of cost for installation, operation, and maintenance, and there is a problem that the entire system is unusable in an event of a failure.

The transport system using the self-propelled carriage has a problem in terms of safety since a person also travels through a passage through which the self-propelled carriage passes. Although it is conceivable to provide a dedicated passage for the self-propelled carriage, a region and equipment for the dedicated passage are required, and a large cost is required.

An object of the invention is to solve the above problems and to implement a medical material transport system that is inexpensive, stable and safe, and that does not lead to a failure of an entire system even when a failure occurs in each specimen transport device.

Solution to Problem

In order to solve the above problem, the invention is configured as follows.

A medical material transport system, including: an unmanned aerial body configured to transport a medical material; a medical material transportation requesting terminal device configured to request the transportation of the medical material to the unmanned aerial body; and a management unit configured to issue, to the unmanned aerial body, a command of a flight operation to a collection place of the medical material and a flight operation from the collection place of the medical material to a transport place based on the transportation request of the medical material from the medical material transportation requesting terminal device.

Advantageous Effect

According to the invention, a medical material transport system that is inexpensive, stable and safe, and that does not lead to a failure of the entire system even when a failure occurs in each specimen transport device can be implemented.

BRIEF DESCRIPTION OF DRAWINGS

FIG. 1 is an overall schematic configuration diagram of a specimen transport system according to a first embodiment.
FIG. 2 shows an operation flow of transporting a specimen according to the first embodiment.
FIG. 3 is a schematic configuration diagram of a drone.
FIG. 4 is a schematic configuration diagram of a specimen holder.
FIG. 5 is a schematic configuration diagram of an arrival station.
FIG. 6 shows a display screen configuration of a specimen collection requesting terminal.
FIG. 7 is an internal functional block diagram of the specimen collection requesting terminal.
FIG. 8 is an explanatory diagram of an information exchange among components.
FIG. 9 is a schematic connection diagram of the specimen transport system including in-hospital equipment.
FIG. 10 shows control functions of a management unit.
FIG. 11 is an explanatory diagram of hierarchical movement of the drone in a facility.
FIG. 12 shows an information exchange in a case of hierarchical movement by an elevator that is the in-hospital equipment.
FIG. 13 shows an arrival station where an unlock key according to a second embodiment is an electronic key.
FIG. 14 is an explanatory diagram of an information transmission method in an emergency according to a third embodiment.
FIG. 15 is an explanatory diagram of an information transmission method when an inside of the facility is congested according to the third embodiment.

DESCRIPTION OF EMBODIMENTS

Hereinafter, embodiments of the invention will be described with reference to attached drawings.

EMBODIMENTS

First Embodiment

FIG. 1 is an overall schematic configuration diagram of a specimen transport system according to a first embodiment of the invention.

In FIG. 1, the specimen transport system according to the first embodiment includes a drone 101 that transports a specimen, a specimen holder 102 that holds the specimen, an arrival station 104 that collects the specimen, a standby dock 105 that allows the drone 101 to stand by, a specimen collection requesting terminal (medical material transport requesting terminal device) 107 that requests specimen collection (transport of a medical material), and a management unit 108 that manages the entire specimen transport system.

The management unit 108 receives a specimen collection request 109 from a specimen collection requesting terminal 107, and sends a specimen reception command 110 to the drone 101. Based on the received information, the drone 101 starts from the standby dock 105 and flies to a specimen collection place 106. After the specimen is collected in the specimen holder 102, the specimen is transported to the arrival station 104 provided in the clinical examination room 103. That is, the management unit 108 commands the drone 101 to perform a flight operation to the specimen collection place 106 and a flight operation from the specimen collection place 106 to the clinical examination room 103 (transport place).

A plurality of specimen collection places 106 are present.

The above is an outline of the system according to the first embodiment of the invention.

Next, a flow of transporting a specimen according to the first embodiment will be described with reference to FIG. 2. FIG. 2 shows an operation flow of transporting the specimen according to the first embodiment.

First, in step S1 in FIG. 2, collection of a specimen is requested by the human hand from the specimen collection requesting terminal 107. At this time, it is assumed that the specimen collection requesting terminal 107 can be provided or carried for each specimen collection place 106.

The management unit 108 that has received the specimen collection request 109 sends the specimen reception command 110 (step S2).

Based on the received information, the drone 101 that has received the specimen reception command 110 starts from the standby dock 105 and flies to the specimen collection place 106 (steps S3 and S4).

A specimen tray 401 (shown in FIG. 4) that allows the specimen to be set is removed by the human hand from the specimen holder 102 of the drone 101 that has flown to the specimen collection place 106 (step S5).

A specimen container 403 is stored in the specimen tray 401, and the specimen tray 401 is returned to the specimen holder 102 and locked by a lock mechanism 402 (shown in FIG. 4) (step S6S9). Accordingly, the specimen tray 401 cannot be removed from the specimen holder 102.

After the specimen container 401 is collected, the drone 101 flies to the arrival station 104 which is a collection place of the specimen (step S7).

After the drone 101 has arrived at the arrival station 104, the specimen tray 401 is removed from the specimen holder 102 by the human hand using a provided unlock key 502 (shown in FIG. 5) (step S8).

After the specimen container 403 in the specimen tray 401 has been collected, the specimen tray 401 is set in the specimen holder 102 by the human hand, and the drone 101 returns to the standby dock 105 (step S9).

The above is the flow of transporting the specimen according to the first embodiment.

Next, a configuration of the drone 101 will be described with reference to FIG. 3. FIG. 3 is a schematic configuration diagram of the drone 101.

In FIG. 3, it is assumed that the drone 101 includes the specimen holder 102 that holds a specimen. It is assumed that the specimen holder 102 is fixed to the drone 101 and cannot be removed. It is assumed that the specimen holder 102 has approximately a size that does not interfere with a flight of the drone 101 and allows the specimen to be contained, has a weight within a transportable weight of the drone 101, and is formed by a material that achieves the above.

It is assumed that the drone 101 is equipped with a sensor 301 and can communicate with the management unit 108 by wireless communication. It is assumed that the drone 101 recognizes a position itself by grasping a rough position by the sensor 301, calculating a movement distance, and recognizing an image.

The sensor 301 is attached to a drone main body 300. The drone main body 300 of the drone 101 includes a flight motor 305, a CPU 306, and a memory 307. The drone main body 300 includes a wireless antenna 304.

It is assumed that the drone 101 flies by always reports the position of the drone 101 itself recognized by the above-described configuration to the management unit 108 by wireless communication, and receives information of a direction and a distance of a course from the management unit 108.

It is assumed that the drone 101 performs charging while waiting in the standby dock 105.

The above is the configuration of the drone 101.

Next, the configuration of the specimen holder 102 will be described with reference to FIG. 4. FIG. 4 is a schematic configuration diagram of the specimen holder 102.

It is assumed that the specimen holder 102 includes a drawer-type sample tray 401 therein, and the specimen tray 401 can be removed from the specimen holder 102.

The specimen tray 401 has a structure capable of accommodating the specimen container 403. It is assumed that the specimen container 403 has a structure in which the specimen container 403 can be fixed in a manner of not moving in the specimen tray 401 due to vibration or inclination during transportation.

It is assumed that, in order to secure security of the specimen to be transported and safety to surroundings, the specimen holder 102 includes the lock mechanism 402 (a specific mechanism capable of locking and unlocking the specimen holder 102). The lock mechanism 402 fixes the specimen tray 401 such that the specimen tray 401 cannot be removed from the sample holder 102 except when the specimen is accommodated in the specimen collection place 106 and when the specimen is collected in the clinical examination room 103.

The above is the configuration of the specimen holder 102.

Next, a configuration of the arrival station 104 will be described with reference to FIG. 5.

FIG. 5 is a schematic configuration diagram of the arrival station 104.

In FIG. 5, positioning markers 501 are formed in the arrival station 104. It is assumed that the drone 101 recognizes an image of the positioning marker 501 by a camera of the sensor 301 and the drone 101 can land on a specified place. It is assumed that the arrival station 104 is provided with an unlock key 502, and that a person can unlock the specimen holder 102 using the unlock key 502 and take out the specimen tray 401. Here, it is assumed that the unlock key 502 is a physical key or an electronic key.

The above is the configuration of the arrival station 104.

FIG. 6 shows a display screen configuration 107A of the specimen collection requesting terminal 107.

In FIG. 6, it is assumed that the specimen collection requesting terminal 107 is an information device such as a tablet or a PC, and is provided with an application 601 that requests collection of the specimen.

It is assumed that the specimen collection requesting terminal 107 can communicate with the management unit 108 in a wireless or wired manner.

The specimen collection requesting terminal 107 includes an operation unit used for specimen collection on the application 601. When the collection of the specimen is requested, a button 602 that causes the drone 101 to be called is pressed. Accordingly, the specimen collection request 109 is sent. At this time, position information registered in advance or recognized using a position recognition function such as a GPS provided in a specimen collection terminal is also sent.

It is assumed that, when the drone 101 arrives at the specimen collection place 106, the specimen collection terminal 107 notifies a specimen collection requester by an alarm or the like. At this time, it is assumed that a landing position fine adjustment key 603 and the button 604 that causes the drone to land can be operated.

A position of the drone 101 can be operated by the human hand by the landing position fine adjustment key 603, and the drone 101 is guided to a place suitable for landing.

After the drone 101 has been guided to the place suitable for landing, the button 604 that causes the drone 101 to land is pressed so that the drone 101 lands.

After landing, the button 605 that causes the specimen holder 102 to be unlocked becomes operable, and the specimen holder 102 is unlocked.

After the specimen container 403 has been put in the specimen tray 401 and accommodated in the specimen holder 102 by the human hand, when the button 606 that causes the drone 101 to depart is pressed, the drone 101 starts to fly. At this time, it is assumed that all functions related to the drone operation of the application 601 cannot be operated, and thereafter, the drone 101 automatically flies without being operated by the human hand.

It is assumed that, when the drone 101 arrives at the arrival station 104, the specimen collection requesting terminal 107 displays an arrival of the specimen and notifies the specimen collection requester of the arrival.

It is assumed that the specimen collection requesting terminal 107 can be operated only by a specimen collection requester registered in advance by security such as a password or a fingerprint authentication.

FIG. 7 is an internal functional block diagram of the specimen collection requesting terminal 107. In FIG. 78, the specimen collection requesting terminal 107 includes a CPU 120, a memory 121, a communication unit 123, and a requesting application storage unit 124, and the requesting application storage unit 124 includes a screen display setting unit 125 and an operation input unit (operation input setting unit) 126.

The above is the configuration and function of the specimen collection requesting terminal 107.

Next, with reference to FIG. 8, information exchange (signal transmission and reception method) among the components according to the first embodiment will be described. FIG. 8 is an explanatory diagram of the information exchange among the components.

In FIG. 8, the specimen collection requesting terminal 107 makes a request of the specimen collection request 109 to the management unit 108, and the management unit 108 transmits the specimen reception command 110 to the drone 101 in response to the request 109.

The drone 101 has a function of transmitting position information of the drone itself, and the position information of the drone itself is transmitted from the drone 101 to the management unit 108 during a flight of the drone 101. In response to this, a traveling direction and movement distance information are transmitted from the management unit 108 to the drone 101. The drone 101 flies based on the transmitted traveling direction and movement distance information.

It is assumed that, in-hospital equipment 800 such as an elevator can be remotely operated from the management unit 108, and when it is necessary to use the in-hospital equipment 800 on the route of the drone 101, an equipment operation command is issued from the management unit 108 to operate the in-hospital equipment 800.

When the drone 101 arrives at the specimen collection place 106, an arrival signal is transmitted from the management unit 108 to the collection requesting terminal 107. A position fine adjustment signal and a landing signal are transmitted from the specimen collection requesting terminal 107 to the drone 101 through the management unit 108 by the operation of the collection requester.

After the accommodation of the specimen container 403 in a specimen holding container 102 has been completed, a delivery request signal is transmitted from the collection requesting terminal 107 to the drone 101 through the management unit 108 by the operation of the collection requester.

When the drone 101 arrives at the arrival station 104, an arrival report is transmitted from the arrival station 104 to the management unit 108. When the unlock key 502 is an electronic key, the unlock key 502 is transmitted to the arrival station 104 at this time. The arrival report is transmitted from the management unit 108 to the collection requesting terminal 107.

When the specimen tray 401 is removed from the specimen holder 102 at the arrival station 104 and the specimen tray 401 is set in the specimen holder 102 again, a collection completion report is transmitted from the arrival station 104 to the management unit 108. The management unit 108 receives the collection completion report and transmits a return command to the drone 101.

After returning to the standby dock 105, the drone 101 transmits a returning report to the management unit 108. At this time, information on a failure place or a place requiring maintenance is transmitted to the management unit 108. It is assumed that the drone 101 transmits a state of charging to the management unit 108 during standby.

The above is the information exchange among the components according to the first embodiment.

FIG. 9 is a schematic connection diagram of the management unit 108 including the in-hospital equipment.

The clinical examination room 103 and the specimen collection place 106 are located in one hospital (in one facility), and the management unit 108 can also perform an operation command of an elevator or an automatic door which is the in-hospital equipment (in-facility equipment).

The management unit 108 is connected to an in-hospital network system 900. Then, the in-hospital network system 900 is connected to the arrival station 104, a wireless communication system 1000, an elevator 801, and an automatic door 803. The elevator 801 and the automatic door 803 are the in-hospital equipment.

The wireless communication system 1000 is connected to the drone 101 and the specimen collection requesting terminal 107.

FIG. 10 shows control functions of a management system.

The management unit 108 performs a drone control 108A, an in-hospital equipment control 108B, a requesting terminal control 108C, and an arrival station control 108D.

The drone control 108A has route (designation of the traveling direction and the distance information) control of the drone 101, takeoff and landing instructions, a pause (hovering) instruction, and drone state monitoring (the position of the drone itself, a stop signal, and an emergency signal).

The in-hospital equipment control 108B has a facility operation instruction and an in-hospital state (congestion and traffic prohibition) collection function. The requesting terminal control 108C has an information communication function. The arrival station control 108D has an unlock information transmission function.

Next, a hierarchical movement of the drone 101 in the facility will be described with reference to FIG. 11.

FIG. 11 is an explanatory diagram of the hierarchical movement of the drone 101 in the facility. In FIG. 11, when the clinical examination room 103 and the specimen collection place 106 are in different layers in a facility such as a hospital, the drone 101 needs to move between the layers. When the drone 101 moves between the layers for transporting the specimen, it is assumed that the in-facility elevator 801 that is also used by humans is used. The in-facility elevator 801 is provided with a drone boarding place 802 inside.

After entering the elevator 801, the drone 101 temporarily lands at the drone boarding place 802. It is assumed that, after the hierarchical movement by the elevator 801, the drone 101 starts to fly again.

It is assumed that, when the drone 101 uses the elevator 801, people around the drone 101 is alerted that the drone 101 is using the elevator 801 to ensure safety.

FIG. 12 shows the signal transmission and reception method (information exchange) in the case of the hierarchical movement by the elevator 801 which is the in-hospital equipment.

In FIG. 12, the drone 101 transmits a signal of the position of the drone itself to the management unit 108. When the management unit 108 detects that the drone 101 is positioned near the door of the elevator 801, the management unit 108 transmits a pause signal to the drone 101. Upon receiving the pause signal, the drone 101 pauses in front of the door of the elevator 801.

Next, the management unit 108 transmits an operation signal for opening the door of the elevator 801 which is the in-hospital equipment 800 to the elevator 801. The elevator 801 opens the door in response to the operation signal, and when the door opening is completed, door open information (completion) is transmitted to the management unit 108.

Subsequently, the management unit 108 transmits an elevator entry command signal to the drone 101. When the drone 101 enters the elevator 801 and is positioned above the drone boarding place 802, the drone 101 transmits the signal of the position of the drone itself to the management unit 108. The management unit 108 detects that the drone 101 is positioned above the drone boarding place 802, and transmits a landing signal to the drone 101. Subsequently, the management unit 108 transmits the operation command to the elevator 801. The elevator 801 closes the door and moves to a target layer, arrives at the target layer, opens the door, and transmits a completion report signal to the management unit 108.

Upon receiving the completion report signal from the elevator 801, the management unit 108 transmits a takeoff signal to the drone 101. Upon receiving the takeoff signal, the drone 101 takes off, exits the elevator, and moves to a destination position.

The above is the hierarchical movement of the drone 101 in the facility.

In the first embodiment, because of a configuration as described above, the specimen transport system that is inexpensive, stable and safe, and that does not lead to a failure of the entire system even when a failure occurs in each specimen transport device, that is, the drone 101, can be implemented.

Hereinafter, embodiments of the invention other than that shown in the first embodiment will be described.

Unless otherwise specified, it is assumed that the components described in the first embodiment are valid even if, in the first embodiment, a part or a plurality of parts of the components are replaced with another embodiment described below. Therefore, it is assumed that the other embodiments of the invention are attained by combining the components according to the first embodiment.

Second Embodiment

A second embodiment will be described.

The second embodiment is another example relating to security.

When the drone 101 is in flight and there is no change in the position information of the drone itself for a certain period of time (or when there is no position information of the drone itself) even though a command to proceed has been issued from the management unit 108, or when the position information of the drone itself is lost, the management unit 108 issues an alarm to give a notification of a possibility of loss of the specimen being transported.

The drone 101 is provided with a plurality of independent specimen holders 102. Accordingly, in a case of passing through a plurality of specimen collection places 106, when there is no change in the position information of the drone itself for a certain period of time, or when the position information of the drone itself is lost, security can be maintained by causing the management unit 108 to issue an alarm.

In the case of an electronic type, the unlock key 502 that unlocks the lock mechanism. 402 is a disposable one-time password, so that security can be protected even when the key is leaked. Security can be strengthened by setting the key for locking as a public key and the key for unlocking as a private key, and making an unlocking system independent from the management unit 108 and setting the unlock system offline.

FIG. 13 shows the arrival station 104 where the unlock key 502 is an electronic key. In FIG. 13, the positioning marker 501 is omitted for a sake of simplification of illustration.

In FIG. 13, 104B is a drone landing detection sensor and has an unlock communication function for unlocking the specimen holder 102. The arrival station 104 includes an information display monitor 104A.

When the drone 101 arrives at the arrival station 104, the drone landing detection sensor 104B detects the arrival and displays an unlock code input field on a display unit of the information display monitor 104A. When, for example, a key code is entered in the input field of the information display monitor 104A, an unlock communication function of the drone landing detection sensor 104 operates to unlock the lock mechanism 402. Here, the lock mechanism 402 is formed in a manner of being able to be locked and unlocked by an electronic or electromagnetic function.

According to the second embodiment, the same effect as that according to the first embodiment can be attained, and the security of the specimen being transported can be further strengthened.

Third Embodiment

Next, a third embodiment will be described.

The third embodiment is an example relating to fail-safe.

The drone 101 is called a multicopter and is characterized by flying by a plurality of propellers, and the number of propellers of a widely used drone is four. In this case, if any one of the propellers is not able to move due to a failure or the like, the drone will crash. By increasing the number of the propellers to six or eight, even if the failure occurs in one of the propellers, the other propellers can cover the failure and the flight can be continued, and therefore a crash can be prevented in an abnormal situation.

Incase that the drone 101 crashes, since the specimen holder 102 is provided with a cushioning material, damage to the specimen container 401 is prevented and the infectious specimen is prevented from scattering. The specimen container 401 is prevented from being damaged by equipping an airbag on the drone 101 itself or the specimen holder 102 and operating the airbag when a drop is detected by an acceleration sensor.

Safety can be ensured by sounding an alarm when the drone 101 crashes to alert people around the drone 101 to stay away from the drone 101.

By equipping the drone 101 with a human motion sensor, the drone 101 can standby on the spot when a person approaches during flight to ensure safety. In this case, it is reported to the management unit 108 that a movement has been stopped because a person has approached the drone 101. The management unit 108 measures stopping time, determines, when the drone 101 stops for time exceeding a preset value, that an abnormal situation has occurred, and displays the occurrence of the abnormal situation on a console of the management unit 108. When the stop signal disappears within the above preset value, the drone 101 resumes the flight.

When the drone 101 detects that the drone 101 has deviated from the route by GPS, the management unit 108 determines that an abnormal situation has occurred and displays the occurrence of the abnormal situation on the console of the management unit 108.

In the third embodiment, in the drone 101, the sensor 301 includes a GPS 303A, an acceleration sensor 303B, and a human motion sensor 303C.

FIG. 14 is an explanatory diagram of an information transmission method in an emergency (route deviation of the drone 101, detection of crash of the drone 101, and detection of an external force).

In FIG. 14, when the GPS 303A of the sensor 301 of the drone 101 detects a deviation from a commanded route, a route deviation detection signal is transmitted to a signal transmission and reception unit 108E of the management unit 108 as an emergency signal via a signal transmission and reception unit 101A of the drone 101.

When the acceleration sensor 303B of the sensor 301 of the drone 101 detects the crash or an external force, a crash detection signal or the like is transmitted to the signal transmission and reception unit 108E of the management unit 108 as the emergency signal via the signal transmission and reception unit 101A of the drone 101.

FIG. 15 is an explanatory diagram of an information transmission method when the facility such as the hospital is congested and a person may approach the drone 101.

In FIG. 15, when the human motion sensor 303C detects that a person has approached the drone 101, a human detection signal is transmitted to a stop unit 101B. The stop unit 101B stops the movement of the drone 101, and transmits the pause signal from the transmission and the signal transmission and reception unit A to the signal transmission and reception unit 108E of the management unit 108.

According to the third embodiment, the same effect as that according to the first embodiment can be attained, and a fail-safe performance can be improved.

The drone 101 is equipped with a light as well as a speaker, and in an emergency or an abnormality, it is possible not only to sound an alarm but also to blink the light.

Fourth Embodiment

Next, a fourth embodiment will be described.

The fourth embodiment is an example relating to foolproof.

The specimen collection requesting terminal 107 makes the button 606 that causes the drone 101 to depart inoperable until the specimen tray 401 is set and locked in the specimen holder 102, so that the specimen collection requesting terminal 107 has a function of preventing the drone 101 from starting flight without locking the specimen tray 401 in the specimen holder 102. The prevention function may command to prohibit the start of a flight of the drone 101 from the specimen collection requesting terminal 107 via the management unit 108, and can also command to prohibit the start of a flight of the drone 101 directly from the specimen collection requesting terminal 107.

The specimen tray 401 is provided with a water leakage detector. Accordingly, when the specimen container 403 is not sufficiently sealed and is mounted on the specimen tray 401, an alarm can be sounded to call attention. Alternatively, when the drone 101 is in flight, the flight can be stopped, an emergency landing can be performed, and a report can be made to the management unit 108.

According to the fourth embodiment, the same effect as that according to the first embodiment can be attained, and a foolproof performance can be improved.

Fifth Embodiment

Next, a fifth embodiment will be described.

The fifth embodiment is an example of an operation of a plurality of the drones 101.

When a plurality of specimen collection places 106 are present, or when it is necessary to convey (synonymous with transport) a large amount of specimens at one time, a plurality of drones 101 are operated.

By operating a plurality of drones 101, a transport processing speed can be improved and a load distribution to the drones 101 can be achieved. When a plurality of drones 101 are operated, it is assumed that the standby docks 105 corresponding to the number of drones 101 are provided. In a logic, the management unit 108 collects information on charging states and failure states from each drone 101 and determines the drone 101 which transmits a transport command.

Specifically, in the logic, the drone 101 in which the failure has occurred is not used, and the command is transmitted to the drone 101 having the largest charge capacity at the time of transmitting the transport command.

In the logic, a flight route of the drone is selected such that, even if a plurality of drones 101 fly, the drones 101 do not interfere with one another.

Specifically, in the logic, the flight route instructed to a certain drone 101 cannot be used from the transport command is transmitted until the returning command is received. When the transport command is issued in the meantime, a route is chosen from available flight routes, and when there is no flight route that can be chosen, the transport command is not sent until the returning command is received.

According to the fifth embodiment, the same effect as that according to the first embodiment can be attained, and the plurality of drones 101 can be operated appropriately and efficiently.

Sixth Embodiment

Next, a sixth embodiment will be described.

The sixth embodiment is an example of the operation of a plurality of specimen collection places 106.

When the plurality of specimen collection places 106 are present, a plurality of specimen collection requesting terminals 107 are provided, so that specimen collection can be requested from each specimen collection requesting terminal 107.

When a request is made, the collection is usually done in an order of the request. However, in a case of an urgent specimen, by setting the specimen as an urgent specimen when the request is made, the collection is performed in a manner of skipping an order of requests from other places, and the urgent specimen is preferentially transported to the clinical examination room 103.

The specimen collection requesting terminal 107 is made portable like a tablet and is carried to each specimen collection place 106, so that the specimens can be collected from the plurality of specimen collection places 106.

According to the sixth embodiment, the same effect as that according to the first embodiment can be attained. Besides, when a plurality of specimen collection places 106 are present, the specimen can be collected from any specimen collection place 106, and in the case of the urgent specimen, the urgent specimen can be preferentially collected and transported to the clinical examination room 103.

Seventh Embodiment

Next, a seventh embodiment will be described.

The seventh embodiment is an example of a decision logic of the movement route of the drone 101.

It is assumed that the flight route of the drone 101 is determined in advance at the time of introduction of the specimen transport system and stored in a storage unit of the management unit 108. In consideration of safety, it is desirable that the flight route of the drone 101 be set in a manner of avoiding a passage having a large traffic amount of people and a main facility as much as possible.

A plurality of flight routes between the specimen collection place 106 and the clinical examination room 103 may be set. In that case, the flight route actually used is determined by logics provided in the management unit 108.

Specifically, the logics are the route determination logic shown in the fifth embodiment when a plurality of drones 101 are operated and the logic of not using a route having a large traffic amount of people depending on time points. It is assumed that the management unit 108 is provided with data of the time points and the traffic amount of people in advance.

According to the seventh embodiment, the same effect as that according to the first embodiment can be attained, and the plurality of drones 101 can be operated appropriately and efficiently.

Eighth Embodiment

Next, an eighth embodiment will be described.

The eighth embodiment is an example in which the specimen can also be transported from outside the facility such as the hospital.

According to the eighth embodiment, the specimen can be transported without being limited to the inside of the facility.

If the specimen collection requesting terminal 107 is provided in the specimen collection place 106, the drone 101 can reach the specimen collection place 106 outside the facility based on a position information recognition function of the specimen collection requesting terminal 107.

The flight route of the drone 101 outside the facility is set to be a route connecting an entrance and departure point set in the facility and a position of the specimen collection requesting terminal 107 by a straight line. However, the drone 101 is provided with a camera or a proximity sensor, and when an obstacle is detected by the camera or the proximity sensor, a detour route is taken.

When a plurality of clinical examination rooms 103 are present inside and outside the facility such as the hospital, if information on test items that can be measured is transmitted to the specimen collection requesting terminal 107 and displayed, a suitable clinical examination room 103 can be selected from the plurality of clinical examination rooms 103 on that spot, and the specimen can be delivered by the drone 101. In the logic, the clinical examination room 103 that can be transported and is displayed on the specimen collection requesting terminal 107 is determined by a remaining battery capacity of the drone 101, a possible flight distance calculated based on the remaining battery capacity, and a distance between a current position and the clinical examination room 103.

According to the eighth embodiment, the same effect as that according to the first embodiment can be attained, and the plurality of drones 101 can be operated appropriately and efficiently.

According to the eighth embodiment, the same effect as that according to the first embodiment can be attained, and the drone 101 can be operated appropriately and efficiently even when the plurality of specimen collection places 106 or the plurality of clinical examination rooms 103 are present inside and outside the facility.

Although the above-described example is an example of transporting the specimen by the drone 101, the drone 101 can transport not only the specimen but also a medical material such as a drug. In the facility where the clinical examination room is provided, since there are demands for transporting various medical materials such as the drug in addition to the specimen, the medical materials such as the specimen and the drug can be transported safely and inexpensively by also applying the invention to the transportation of the drug and the like.

Therefore, the invention can implement not only the specimen transport system but also a medical material transport system capable of transporting the medical material such the drug other than the specimen.

Although in the above-described example, the specimen is transported by the drone, an unmanned aerial body (for example, a radio-controlled aerial body) other than the drone can be applied to the invention. Therefore, the drone, the radio-controlled aerial body and the like applied to the invention are collectively defined as the unmanned aerial body that transports the medical material. The unmanned aerial body is an object that flies in space.

The management unit 108 can be provided at any place. For example, the management unit 108 may be provided in a server room or the clinical examination room 103.

The transport place of the medical material is not limited to the clinical examination room 103, and may also be, for example, a patient hospitalization room.

REFERENCE SIGN LIST

101: drone
101A, 108E: transmission and reception unit
102: specimen holder
103: clinical examination room
104: arrival station
104A: information display monitor
104B: drone landing detection sensor
105: drone standby dock
106: specimen collection place
107: specimen collection requesting terminal
107A: display screen configuration
108: management unit
108A: drone control
108B: in-hospital equipment control
108C: requesting terminal control
108D: arrival station control
109: specimen collection request
110: specimen reception command
120: CPU
121: memory
123: communication unit
124: requesting application storage unit
125: screen display setting unit
126: operation input unit
300: drone main body
301: sensor
303A: GPS
303B: acceleration sensor
303C: human motion sensor
304: wireless antenna
305: flight motor
306: CPU
307: memory
401: specimen tray
402: lock mechanism
403: specimen container
501: positioning marker
502: unlock key
601: specimen transportation requesting application
602: button that causes drone to be called
603: landing position fine adjustment key
604: button that causes drone to land
605: button that causes specimen holding container to be unlocked
606: button that causes drone to depart
800: in-hospital equipment
801: elevator
802: drone boarding place
803: automatic door
900: in-hospital network system
1000: wireless communication system

The invention claimed is:

1. A medical material transport system, comprising:
an unmanned aerial body configured to transport a medical material;
a medical material transportation requesting terminal device configured to request the transportation of the medical material to the unmanned aerial body; and
a management unit configured to issue, to the unmanned aerial body, a command of a flight operation to a collection place of the medical material and a flight operation from the collection place of the medical material to a transport place based on the transportation request of the medical material from the medical material transportation requesting terminal device, wherein
the medical material transportation requesting terminal device includes an operation unit that is provided in the collection place of the medical material, that is configured to operate the unmanned aerial body, and that is configured to guide the unmanned aerial body to land, and
the unmanned aerial body includes a holder configured to hold the medical material and a medical material tray that is accommodated inside the holder, that is capable of being removed from the holder, and that is configured to accommodate the medical material, the medical material tray includes a water leakage detector, and when water leakage is detected by the water leakage detector, the unmanned aerial body sounds an alarm.

2. The medical material transport system according to claim 1, wherein
the medical material is a specimen, the collection place of the medical material is a specimen collection place, and the transport place of the medical material is a clinical examination room.

3. The medical material transport system according to claim 2, wherein
the unmanned aerial body is a drone.

4. The medical material transport system according to claim 3, wherein
the drone includes a holder configured to hold the specimen, and the holder is locked and unlocked by a specific lock mechanism.

5. The medical material transport system according to claim 4, wherein
the collection place of the medical material and the clinical examination room is located in one facility, and the management unit issues an operation command to an equipment in the facility and issues a flight operation command to the drone.

6. The medical material transport system according to claim 5, wherein
the equipment in the facility is an elevator and an automatic door.

7. The medical material transport system according to claim 4, wherein
the drone has a function of transmitting position information of the drone itself to the management unit, and the management unit issues an alarm when no position information of the drone itself is transmitted from the drone for a certain period of time or longer.

8. The medical material transport system according to claim 7, wherein
the lock mechanism is an electronical lock mechanism.

9. The medical material transport system according to claim 4, wherein
when the holder is not locked by the lock mechanism, the medical material transportation requesting terminal device issues a command to prohibit a start of a flight of the drone.

10. The medical material transport system according to claim 4, wherein
the clinical examination room is located in one facility, and the collection place of the specimen is located outside the facility.

11. The medical material transport system according to claim 3, wherein
a plurality of the drones are present.

12. The medical material transport system according to claim 11, wherein
a plurality of the specimen collection places are present.

13. The medical material transport system according to claim 1, wherein
a flight route of the unmanned aerial body is predetermined in a manner of avoiding a passage having a traffic amount of people and a main facility.

14. The medical material transport system according to claim 1, wherein
the unmanned aerial body includes a holder that is configured to hold the medical material and that is locked and unlocked by a lock mechanism, and the medical material transportation requesting terminal device includes an unlock button configured to unlock the lock mechanism and a departure button configured to cause the unmanned aerial body to start a flight.

15. The medical material transport system according to claim 13, wherein
a plurality of the flight routes of the unmanned aerial body are set, and the flight route to be used among the plurality of flight routes is determined by the management unit.

16. The medical material transport system according to claim 1, wherein
when the medical material is an urgent specimen, the medical material is set as an urgent specimen by the medical material transportation requesting terminal device, and when the unmanned aerial body is requested to transport the urgent specimen, the unmanned aerial body preferentially transports the urgent specimen.

17. A medical material transport system comprising:
an unmanned aerial body configured to transport a medical material;
a medical material transportation requesting terminal device configured to request the transportation of the medical material to the unmanned aerial body; and
a management unit configured to issue, to the unmanned aerial body, a command of a flight operation to a collection place of the medical material and a flight operation from the collection place of the medical material to a transport place based on the transportation request of the medical material from the medical material transportation requesting terminal device, wherein
the medical material transportation requesting terminal device includes an operation unit that is provided in the collection place of the medical material, that is configured to operate the unmanned aerial body, and that is configured to guide the unmanned aerial body to land,
the medical material is a specimen, the collection place of the medical material is a specimen collection place, and the transport place of the medical material is a clinical examination room,
the unmanned aerial body is a drone, and
the drone includes an acceleration sensor, a GPS and a human motion sensor, a position of the drone is transmitted to the management unit by the GPS, an emergency signal is transmitted to the management unit when a crash of the drone and an external force is detected by the acceleration sensor, and the drone pauses and a pause signal is transmitted to the management unit when approaching of a person is detected by the human motion sensor.

18. The medical material transport system according to claim 17, wherein
the drone sounds an alarm when a crash of the drone is detected by the acceleration sensor.

19. A medical material transport system comprising:
an unmanned aerial body configured to transport a medical material;
a medical material transportation requesting terminal device configured to request the transportation of the medical material to the unmanned aerial body; and
a management unit configured to issue, to the unmanned aerial body, a command of a flight operation to a collection place of the medical material and a flight operation from the collection place of the medical material to a transport place based on the transportation request of the medical material from the medical material transportation requesting terminal device, wherein
the medical material transportation requesting terminal device includes an operation unit that is provided in the collection place of the medical material, that is configured to operate the unmanned aerial body, and that is configured to guide the unmanned aerial body to land, and
the unmanned aerial body includes a holder configured to hold the medical material and a medical material tray that is accommodated inside the holder, that is capable of being removed from the holder, and that is configured to accommodate the medical material, the medical material tray includes a water leakage detector, and when water leakage is detected by the water leakage detector, the unmanned aerial body lands in emergency and reports to the management unit.

* * * * *